United States Patent
Um

(10) Patent No.: US 10,303,361 B2
(45) Date of Patent: May 28, 2019

(54) MEMORY SYSTEM AND METHOD FOR BUFFERING AND STORING DATA

(71) Applicant: SK hynix Inc., Gyeonggi-do (KR)

(72) Inventor: Gi-Pyo Um, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 15/448,756

(22) Filed: Mar. 3, 2017

(65) Prior Publication Data

US 2017/0371548 A1 Dec. 28, 2017

(30) Foreign Application Priority Data

Jun. 22, 2016 (KR) ........................ 10-2016-0078045

(51) Int. Cl.
*G06F 3/06* (2006.01)
*G06F 12/02* (2006.01)

(52) U.S. Cl.
CPC ............ *G06F 3/0604* (2013.01); *G06F 3/061* (2013.01); *G06F 3/064* (2013.01); *G06F 3/0656* (2013.01); *G06F 3/0679* (2013.01); *G06F 12/0246* (2013.01); *G06F 2212/1016* (2013.01); *G06F 2212/7201* (2013.01); *G06F 2212/7203* (2013.01); *G06F 2212/7207* (2013.01); *G06F 2212/7208* (2013.01)

(58) Field of Classification Search
CPC ..... G06F 3/0656; G06F 3/0679; G06F 3/0689
USPC .......................................................... 711/157
See application file for complete search history.

(56) References Cited

U.S. PATENT DOCUMENTS

| | | | |
|---|---|---|---|
| 7,069,389 B2 | 6/2006 | Cohen | |
| 8,250,333 B2 | 8/2012 | Gorobets et al. | |
| 8,468,278 B2 | 6/2013 | Radhakrishnan et al. | |
| 2009/0271562 A1 | 10/2009 | Sinclair | |
| 2014/0052953 A1* | 2/2014 | Ben-Tsion | G06F 3/0605 711/172 |
| 2014/0219021 A1* | 8/2014 | Trantham | G11C 5/143 365/185.04 |
| 2015/0155050 A1* | 6/2015 | Trantham | G11C 16/3418 365/185.03 |

* cited by examiner

*Primary Examiner* — Than Nguyen
(74) *Attorney, Agent, or Firm* — IP & T Group LLP

(57) ABSTRACT

A memory system may include: a memory system may include: a memory device suitable for storing user data and corresponding metadata; and a controller including a memory, the controller being suitable for storing user data and corresponding metadata in the memory and for controlling the memory device for storing therein the user data and the metadata of the memory when sizes of the user data and metadata of the memory reach first and second thresholds, respectively.

11 Claims, 10 Drawing Sheets

MEMORY SYSTEM AND METHOD FOR BUFFERING AND STORING DATA

CROSS-REFERENCE TO RELATED APPLICATION

This application claims priority under 35 U.S.C. § 119(a) to Korean Patent Application. No. 10-2016-0078045 filed on Jun. 22, 2016 in the Korean Intellectual Property Office, the disclosure of which is incorporated herein by reference in its entirety.

TECHNICAL FIELD

Exemplary embodiments relate to a memory system and, more particularly, to a memory system for processing data to and from a memory device, and an operating method thereof.

DISCUSSION OF THE RELATED ART

The computer environment paradigm has shifted to ubiquitous computing systems that can be used anytime and anywhere. Due to this, use of portable electronic devices such as mobile phones, digital cameras, and notebook computers has rapidly increased. These portable electronic devices generally use a memory system having one or more semiconductor memory devices for storing data. The memory system may be used as a main memory device or an auxiliary memory device of a portable electronic device.

Memory systems using semiconductor memory devices provide excellent stability, durability, high information access speed and low power consumption, since they have no moving parts. Examples of memory systems having such advantages include universal serial bus (USB) memory devices, memory cards having various interfaces, and solid state drives (SSD).

SUMMARY

Various embodiments are directed to a memory system and an operating method thereof exhibiting reduced complexity and performance deterioration. The memory system and the operating method thereof, also increase the use efficiency of a memory device employed by the memory system, thereby more quickly and stably processing data to and from the memory device.

In an embodiment, a memory system may include: a memory device suitable for storing user data and corresponding metadata; and a controller including a memory, the controller being suitable for storing user data and corresponding metadata in the memory and for controlling the memory device for storing therein the user data and the metadata of the memory when sizes of the user data and metadata of the memory reach first and second thresholds, respectively.

The controller may control the memory device for storing the user data and the metadata of the memory in two or more different memory blocks of the memory device in an interleaving manner.

The controller may control the memory device for storing therein the user data and the metadata of the memory in the interleaving manner on a page basis.

The controller may control the memory device for storing therein the metadata of the memory by a unit of a page.

The controller may control the memory device for storing therein the user data and the metadata of the memory when segment numbers of the user data and the metadata reach first and second thresholds, respectively.

The memory blocks may be provided in one or more among a plurality of planes of one or more among a plurality of dies included in the memory device.

The memory blocks may be coupled to the same channel.

In an embodiment, an operating method of memory system may include: buffering user data and corresponding metadata; and storing the buffered user data and the buffered metadata when sizes of the buffered user data and metadata reach first and second threshold, respectively.

The storing of the buffered user data and the buffered metadata may be performed in two or more different memory blocks of the memory system in an interleaving manner.

The storing of the buffered user data and the buffered metadata may be performed in the interleaving manner on a page basis.

The storing of the buffered user data and the buffered metadata may include storing the buffered metadata by a unit of a page.

The storing of the buffered user data and the buffered metadata may be respectively performed when segment numbers of the buffered user data and the buffered metadata reach first and second threshold, respectively.

The user data may be stored in a first super memory block through a first one-shot program.

Then the metadata may be stored in a second super memory block through a second one-shot program.

The first and second super memory blocks may be different and the first and second one-shot programs are different.

BRIEF DESCRIPTION OF THE DRAWINGS

These and other features and advantages of the present invention will become apparent to persons skilled in the art to which this invention pertains from the following detailed description of various embodiments of the present invention in reference to the accompanying drawings, wherein.

DETAILED DESCRIPTION

Figure 1:
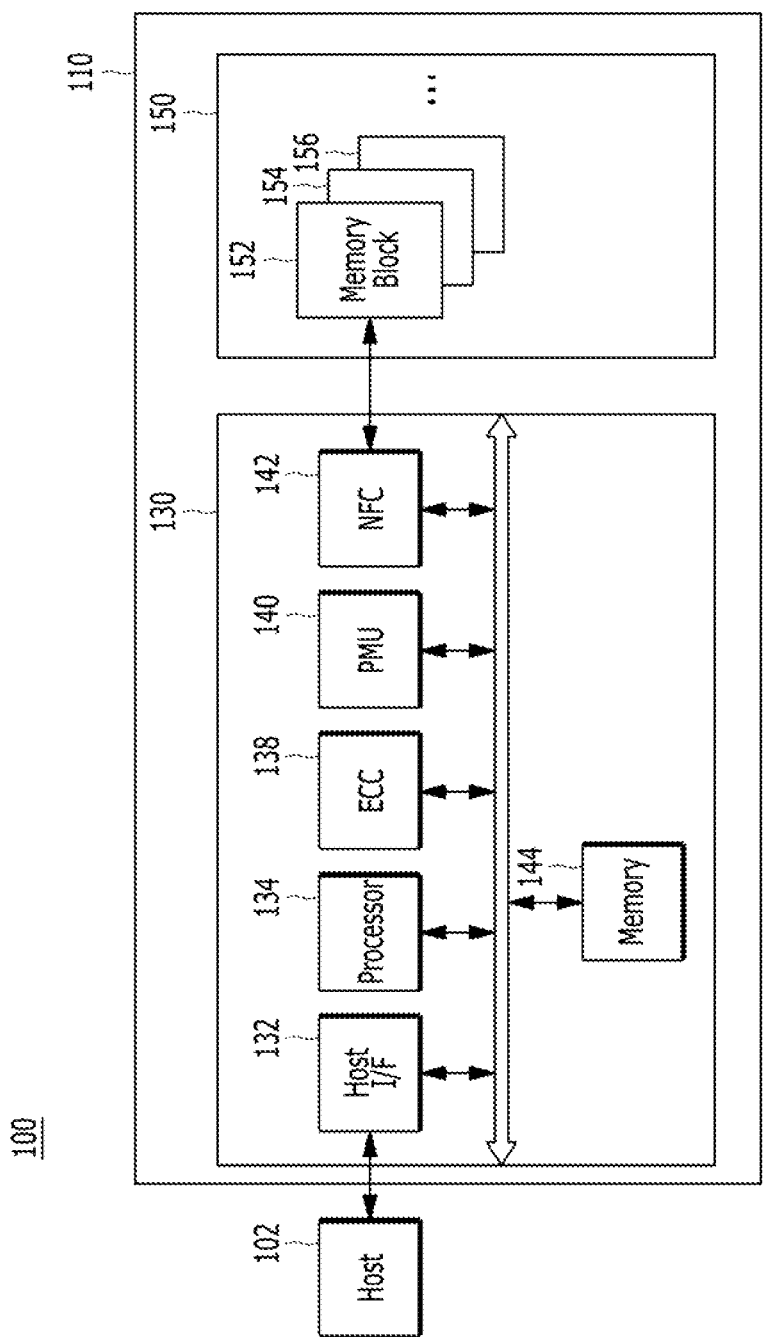
FIG. 1 is a diagram illustrating a data processing system including a memory system coupled to a host, according to an embodiment of the present invention.

Although, various embodiments are described below in more detail with reference to the accompanying drawings, we note that the present invention may, however, be embodied in different forms and should not be construed as being limited only to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

It will be understood that, although the terms "first" "second" "third" and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to clearly illustrate features of the embodiments.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention.

As used herein, singular forms are intended to include the plural forms as well, unless the context clearly indicates otherwise.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

We further note that in the following description, numerous specific details are set forth in for providing a thorough understanding of the present invention. However, would be apparent to those skilled in the relevant art, the present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment unless otherwise specifically indicated.

Hereinafter, the various embodiments of the present invention will be described with reference to the attached drawings.

FIG. 1 illustrates a data processing system 100 including a memory system 110, according to an embodiment of the present invention.

Referring to FIG. 1, a data processing system 100 may include a host 102 operatively coupled to a memory system 110.

The host 102 may include, for example, a portable electronic device such as a mobile phone, an MP3 player and a laptop computer or a non-portable electronic device such as a desktop computer, a game player, a TV and a projector.

The memory system 110 may operate in response to a request received from the host 102. For example, the memory system 110 may store data to be accessed by the host 102. The memory system 110 may be used as a main memory system or an auxiliary memory system of the host 102. The memory system 110 may be implemented with any one of various storage devices, according to the protocol of a host interface to be coupled electrically with the host 102. The memory system 110 may be implemented with any one of various storage devices, such as for example, a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick and the like.

The storage devices for the memory system 110 may be implemented with a volatile memory device, such as, a dynamic random access memory (DRAM) and a static random access memory (SRAM) or a nonvolatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase-change RAM (PRAM), a magnetoresistive RAM (MRAM), a resistive RAM (RRAM), and a flash memory.

The memory system 110 may include a memory device 150 for storing data to be accessed by the host 102, and a controller 130 operatively coupled to the memory device 150 for controlling the storage of data in the memory device 150 and the transfer of stored data from the memory device 150 to the host.

The controller 130 and the memory device 150 may be integrated into a single semiconductor device. For instance, the controller 130 and the memory device 150 may be integrated into a single semiconductor device configured as a solid state drive (SSD), When the memory system 110 is used as the SSD, the operation speed of the host 102 that is electrically coupled with the memory system 110 may be significantly increased.

The controller 130 and the memory device 150 may be integrated into a single semiconductor device configured as a memory card, such as, for example, a Personal Computer Memory Card International Association (PCMCIA) card a compact flash (CF) card, a smart media card (SMC), a memory stick, a multimedia card (MMC), an RS-MMC, a micro-MMC, a secure digital (SD) card, a mini-SD, a micro-SD, an SDHC, and a universal flash storage (UFS) device.

For another instance, the memory system 110 may be configured as part of a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a three-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, an RFID device, or one of various component elements configuring a computing system.

The memory device 150 of the memory system 110 may retain stored data when power supply to the device is interrupted and, in particular, store the data provided from the host 102 during a write operation, and provide stored data to the host 102 during a read operation. The memory device 150 may include a plurality of memory blocks, for example, memory blocks 152, 154 and 156. Each of the memory blocks 152, 154 and 156 may include a plurality of pages. Each of the pages may include a plurality of memory cells coupled to a word line (WL), The memory device 150 may be a nonvolatile memory device, for example, a flash memory. The flash memory may have a three-dimensional (3D) stack structure. The structure of the memory device 150 and the three-dimensional (3D) stack structure of the memory device 150 will be described later.

The controller 130 of the memory system 110 may control the memory device 150 in response to a request from the host 102. For example, upon receiving a read request from the host 102 the controller 130 may issue a read command and an address to the memory device for reading the data which are stored in the requested address in the memory device and may provide the data read from the memory device 150, to the host 102. Also in response to a program request (also referred to as a write request) received from the host 102, the controller 130 may issue a write command, an address and write data and may control the operation of the memory device for storing the write data into the memory device 150. The write data are provided from the host 102 to the memory controller together with the write request. To this end, the controller 130 may control one or more operations of the memory device 150 including, for example, a read operation, a write operation and an erase operation. The controller 130 may also control one or more background operations of the memory device 150.

In the illustrated embodiment of FIG. 1, the controller 130 includes a host interface unit 132, a processor 134, an error correction code (ECC) unit 138, a power management unit (PMU) 140, a NAND flash controller (NFC) 142, and a memory 144.

The host interface unit 132 provides an interface between the host and the controller 130. For example, the host interface 132 may receive and process requests, addresses and data provided from the host 102. The host interface may also transmit read data from the memory device to the host. The host interface 132 may communicate with the host 102 through at least one of various well-known interface protocols such as a universal serial bus (USB), a multimedia card (MMC) a peripheral component interconnect-express (PCI-E), a serial attached SCSI (SAS), a serial advanced technology attachment (SATA), a parallel advanced technology attachment (DATA), small computer system interface (SCSI), enhanced small disk interface (ESDI), and integrated drive electronics (IDE).

The ECC unit 138 may detect and correct errors in the data read from the memory device 150 during the read operation. The ECC unit 138 may not correct error bits when the number of the error bits is greater than or equal to a threshold number of correctable error bits, and may output an error correction fail signal indicating failure in correcting the error bits.

The ECC unit 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC unit 138 may include all circuits, systems or devices for the error correction operation.

The PMU 140 may provide and manage power for the controller 130, that is, power for the component elements included in the controller 130.

The NEC 142 may serve as a memory interface between the controller 130 and the memory device 150 to allow the controller 130 to control the memory device 150 in response to a request from the host 102. The NEC 142 may generate control signals for the memory device 150 and process data under the control of the processor 134 when the memory device 150 includes a flash memory and, in particular, when the memory device 150 includes a NAND flash memory.

The memory 144 may serve as a working memory of the memory system 110 and the controller 130, and store data for driving the memory system 110 and the controller 130. The controller 130 may control the memory device 150 in response to a request from the host 102. For example, the controller 130 may provide the data read from the memory device 150 to the host 102 and store the data provided from the host 102 in the memory device 150. When the controller 130 controls the operations of the memory device 150, the memory 144 may store data used by the controller 130 and the memory device 150 for such operations as read operation, write operation, program operation and erase operation.

The memory 144 may be implemented with volatile memory. The memory 144 may be implemented with a static random access memory (SRAM) or a dynamic random access memory (DRAM). As described above, the memory 144 may store data used by the host 102 and the memory device 150 for the read and write operations. To store the data, the memory 144 may include a program memory, a data memory, a write buffer, a read buffer, a map buffer, and so forth.

The processor 134 may control general operations of the memory system 110, and a write operation or a read operation for the memory device 150 in response to a write request or a read request from the host 102. The processor 134 may drive firmware, which is referred to as a flash translation layer (FTL) to control the general operations of the memory system 110. The processor 134 may be implemented with a microprocessor or a central processing unit (CPU).

A management unit (not shown) may be included in the processor 134, and may perform bad block management of the memory device 150. The management unit may find bad memory blocks included in the memory device 150, which are in unsatisfactory condition for further use, and perform bad block management on the bad memory blocks. When the memory device 150 is a flash memory, for example, a NAND flash memory, a program failure may occur during the write operation, for example, during the program operation, due to characteristics of a NAND logic function, During the bad block management, the data of the program-failed memory block or the bad memory block may be programmed into a new memory block. Also, the bad blocks due to the program fail seriously deteriorates the utilization efficiency of the memory device 150 having a 3D stack structure and the reliability of the memory system 100, and thus reliable bad block management is required.

Figure 2:
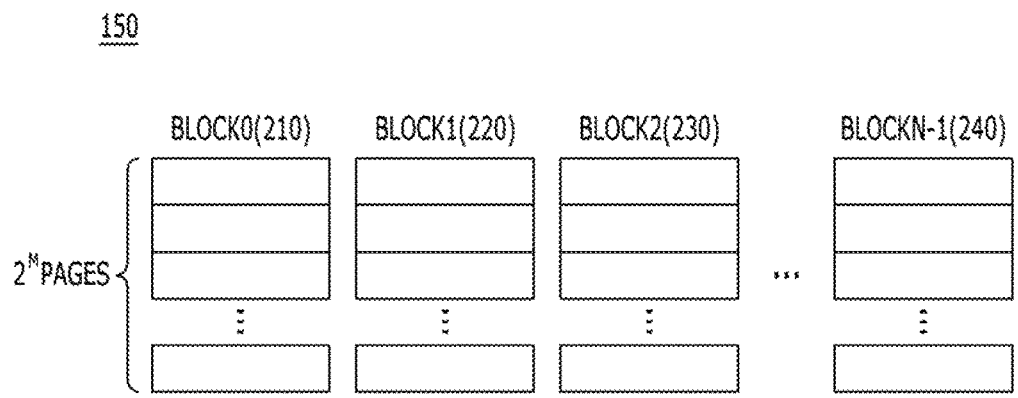
FIG. 2 is a diagram illustrating a memory device employed in the memory system of FIG. 1, according to an embodiment of the present invention.

FIG. 2 is a schematic diagram illustrating the memory device 150 of FIG. 1.

Referring to FIG. 2, the memory device 150 may include a plurality of memory blocks, for example, zeroth to $(N-1)^{th}$ blocks 210 to 240. Each, of the plurality of memory blocks 210 to 240 may include a plurality of pages, for example, $2^M$ number of pages ($2^M$ PAGES) to which the present invention will not be limited. Each of the plurality of pages may include a plurality of memory cells to which a plurality of word lines are electrically coupled.

Also, the memory device 150 may include a plurality of memory blocks, as single level cell (SLC) memory blocks and multi-level cell (MLC) memory blocks, according to the number of bits which may be stored or expressed in each memory cell. The SLC memory block may include a plurality of pages which are implemented with memory cells each capable of storing 1-bit data. The MLC memory block may include a plurality of pages which are implemented with memory cells each capable of storing multi-bit data, for example, two or more-bit data. The MLC memory block including a plurality of pages which are implemented with memory cells that are each capable of storing 3-bit data may be defined as a triple level cell (TLC) memory block.

Each of the plurality of memory blocks 210 to 240 may store the data provided from the host device 102 during a write operation, and may provide stored data to the host 102 during a read operation.

Figure 3:
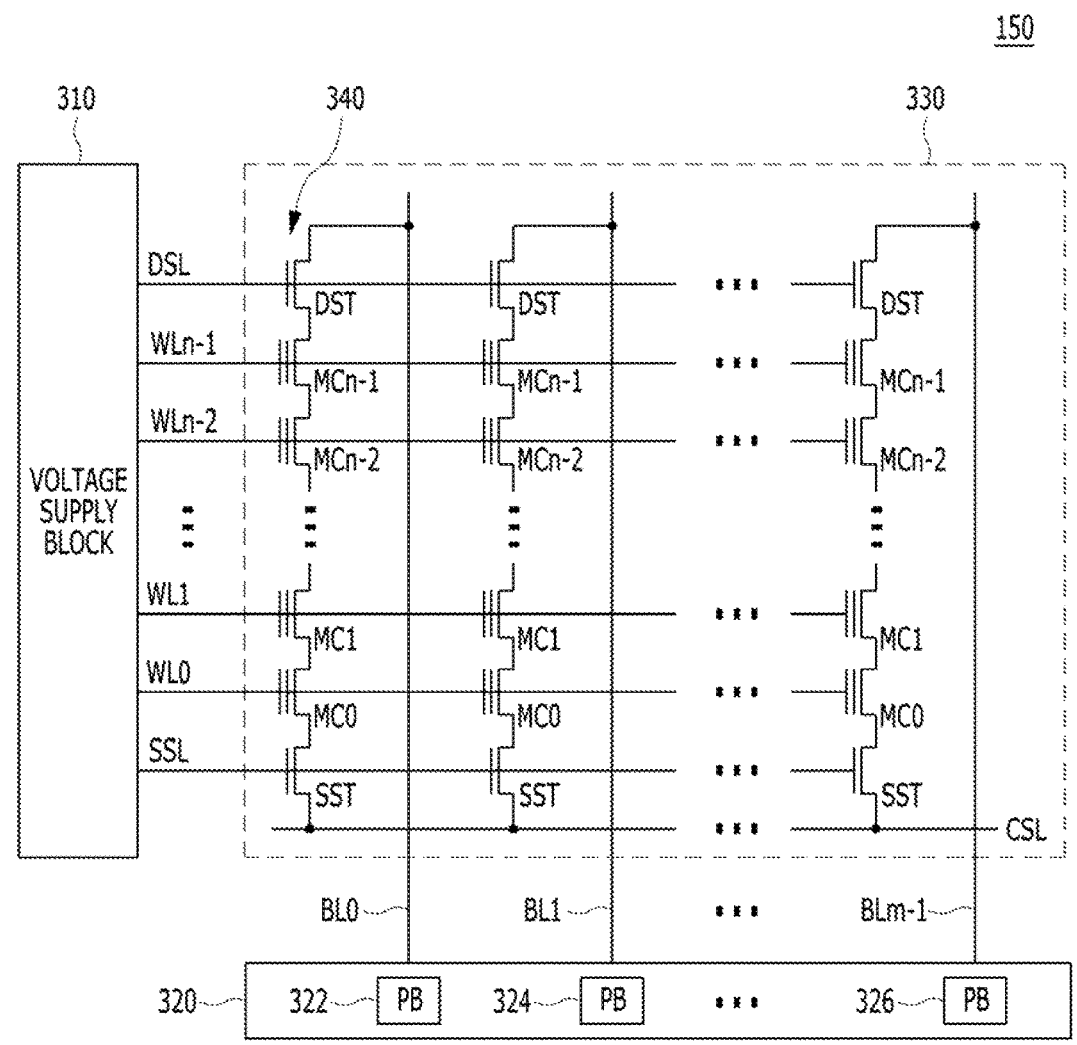
FIG. 3 is a diagram schematically illustrating a memory cell array circuit of a memory block of the memory device of FIG. 2.

FIG. 3 is a circuit diagram illustrating an example of a memory block in a memory device.

Referring to FIG. 3, a memory block 330 of a memory device 300 may include a plurality of cell strings 340 which are realized into a memory cell array and are coupled to bit lines BL0 to BLm−1, respectively. The cell string 340 of each column may include at least one drain select transistor DST and at least one source select transistor SST. A plurality of memory cells or memory cell transistors MC0 to MCn−1 may be coupled in series between the select transistors DST and SST. The respective memory cells MC0 to MCn−1 may be constructed by mufti-level cells (MLC) each of which stores a data information of a plurality of bits. The cell strings 340 may be electrically coupled to corresponding bit lines BL0 to BLm−1, respectively. For reference, in FIG. 3, 'DSL' may denote a drain select line, 'SSL' may denote a source select line, and 'CSC' may denote a common source line.

While FIG. 3 shows, as an example, the memory block 330 which is constructed by NAND flash memory cells, it is to be noted that the memory block 330 of the memory device 300 according to the embodiment is not limited to a NAND flash memory and may be realized by a NOR flash memory, a hybrid flash memory in which at least two kinds of memory cells are combined or a one-NAND flash memory in which a controller is built in a memory chip. The operational characteristics of a semiconductor device may be applied to not only a flash memory device in which a charge storing layer is constructed by conductive floating gates but also a charge trap flash (CTF) in which a charge storing layer is constructed by a dielectric layer.

A voltage supply block 310 of the memory device 300 may provide word line voltages (for example, a program voltage, a read voltage and a pass voltage) to be supplied to respective word lines according to an operation mode and voltages to be supplied to bulks (for example, well regions) formed with memory cells. The voltage generating operation of the voltage supply block 310 may be performed by the control of a control circuit (not shown). The voltage supply block 310 may generate a plurality of variable read voltages to generate a plurality of read data, select one of the memory blocks (or sectors) of a memory cell array in response to the control of the control circuit, select one of the word lines of the selected memory block, and provide the word line voltages to the selected word line and unselected word lines.

A read/write circuit 320 of the memory device 300 is controlled by the control circuit, and may operate as a sense amplifier or a write driver according to an operation mode. For example, in the case of a verify/normal read operation, the read/write circuit 320 may operate as a sense amplifier for reading data from the memory cell array. Also, in the case of a program operation, the read/write circuit 320 may operate as a write driver which drives bit lines according to data to be stored in the memory cell array. In the program operation, the read/write circuit 320 may receive data to be written in the memory cell array, from a buffer (not shown), and may drive the bit lines according to inputted data. To this end, the read/write circuit 320 may include a plurality of page buffers (PB) 322, 324 and 326 respectively corresponding to columns (or bit lines) or pairs of columns (or pairs of bit lines), and a plurality of latches (not shown) may be included in each of the page buffers 322, 324 and 326.

Figure 4:
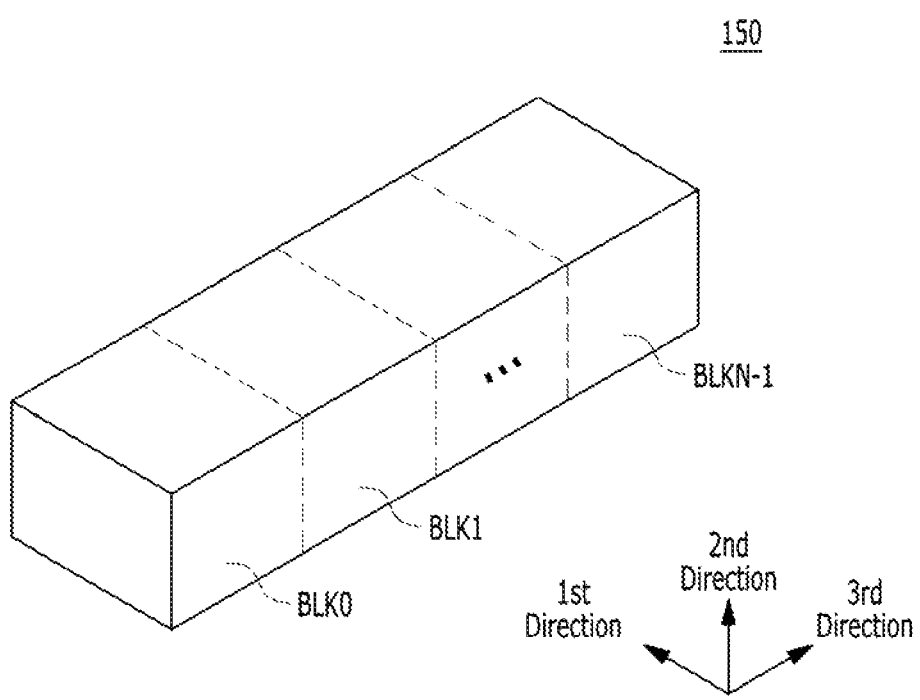
FIG. 4 is a diagram schematically illustrating a three-dimensional structure of the memory device of FIG. 2.

Also, the memory device 150 may be realized as a 2-dimensional or 3-dimensional memory device. As shown in FIG. 4, in the case where the memory device 150 is realized as a 3-dimensional nonvolatile memory device, the memory device 150 may include a plurality of memory blocks BLK0 to BLKN−1.

FIG. 4 is a block diagram illustrating the memory blocks of the memory device shown in FIG. 2, and the memory blocks BLK0 to BLKN−1 may be realized as a 3-dimensional structure (or a vertical structure). For example, the respective memory blocks BLK0 to BLKN−1 may be realized as a 3-dimensional structure by including a structure which extends in first to third directions, for example, the x-axis direction, the y-axis direction and the z-axis direction.

The respective memory blocks BLK0 to BLKN−1 included in the memory device 150 may include a plurality of NAND strings which extend in the second direction. The plurality of NAND strings may be provided in the first direction and the third direction. Each NAND string may be coupled to a bit line, at least one string select line, at least one ground select line, a plurality of word lines, at least one dummy word line and a common source line, and may include a plurality of transistor structures.

Namely, among the plurality of memory blocks BLK0 to BLKN−1 of the memory device 150, the respective memory blocks BLK0 to BLKN-1 may be coupled to a plurality of bit lines, a plurality of string select lines, a plurality of ground select lines, a plurality of word lines, a plurality of dummy word lines and a plurality of common source lines, and accordingly, may include a plurality of NAND strings. Also, in the respective memory blocks BLK0 to BLKN-1, a plurality of NAND strings may be coupled to one bit line, and a plurality of transistors may be realized in one NAND string. A string select transistor of each NAND string may be coupled to a corresponding bit line, and a ground select transistor of each NAND string may be coupled to the common source line. Memory cells may be provided between the string select transistor and the ground select transistor of each NAND string. Namely, in the plurality of memory blocks BLK0 to BLKN-1 of the memory device 150, a plurality of memory cells may be realized in each of the memory blocks BLK0 to BLKN-1.

Figure 5:
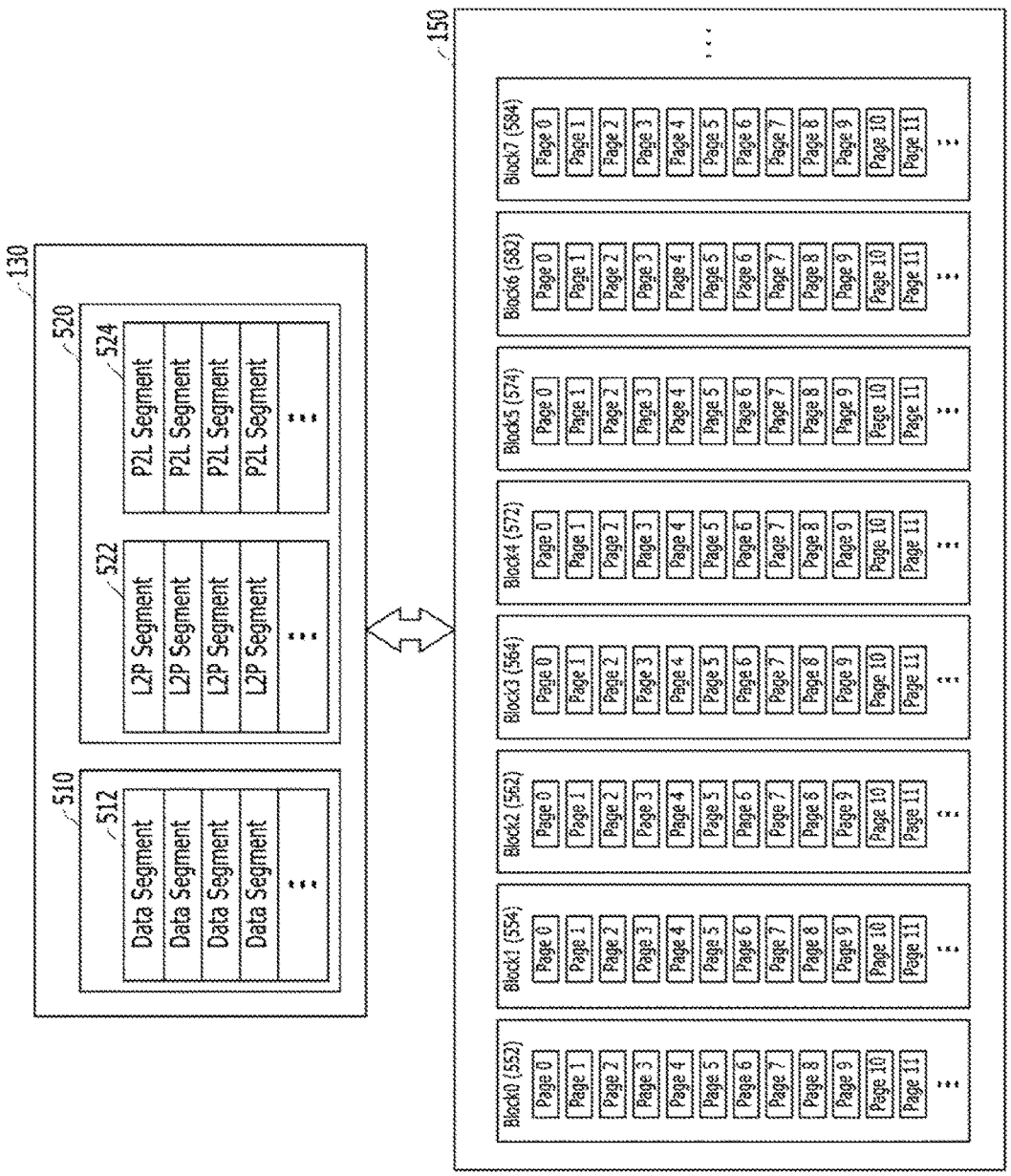
FIGS. 5 to 7 are diagrams schematically illustrating an example of a data processing operation of a memory system, according to an embodiment of the present invention.
Figure 6:
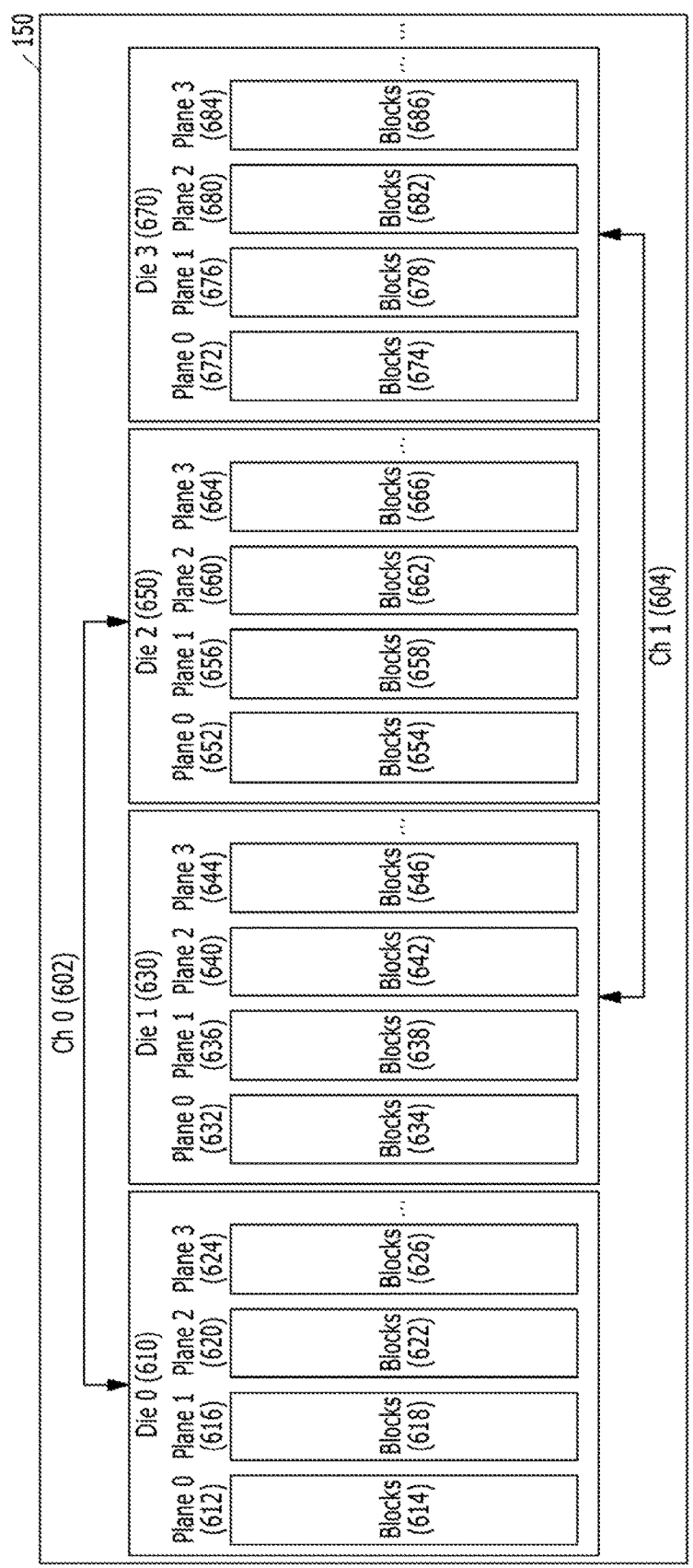
Figure 7:
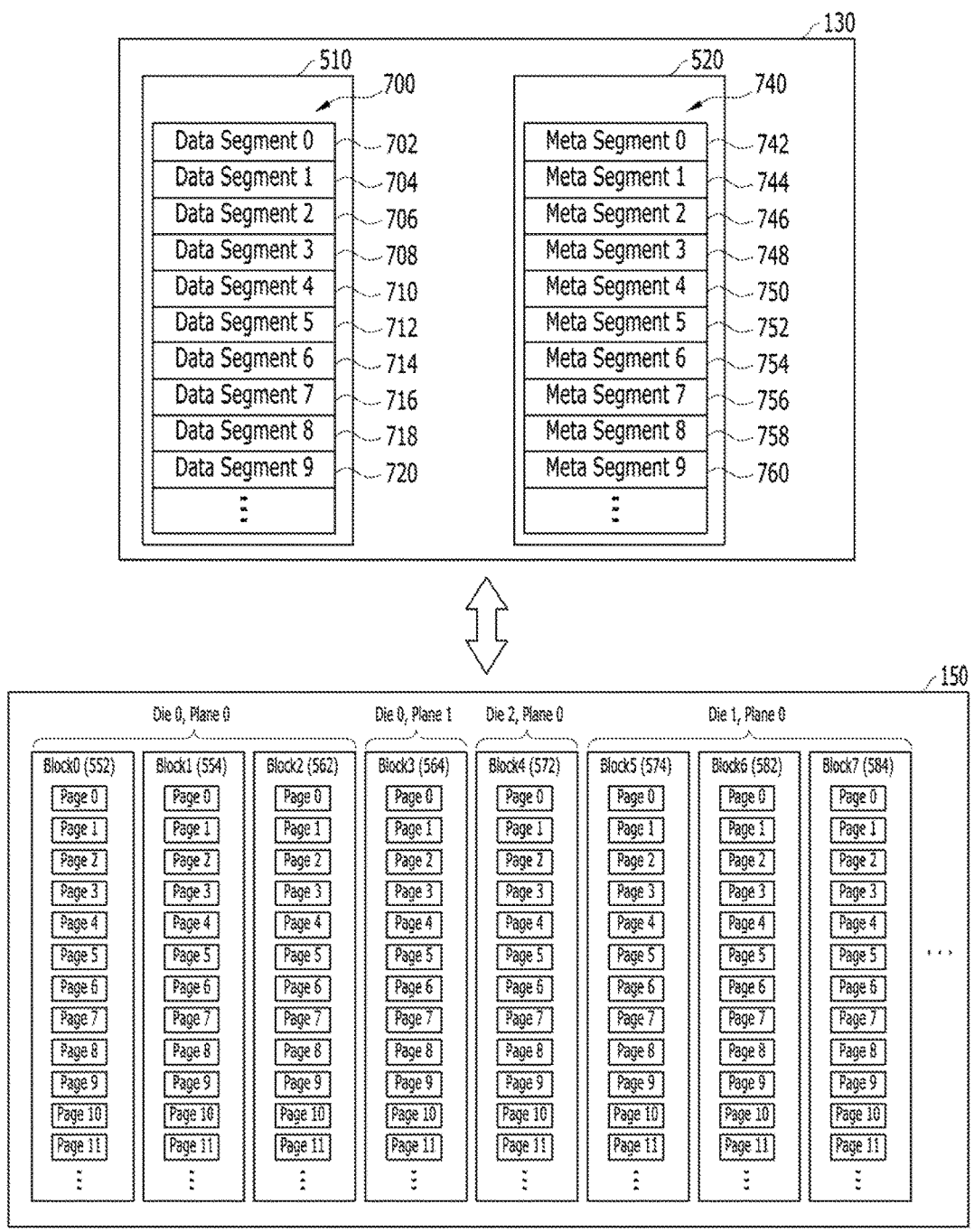

FIGS. 5 to 7 are schematic diagrams illustrating an example of an operation of the memory system 110 of FIG. 1, according to an embodiment of the present invention.

Metadata may be stored in the memory blocks 152 to 156 together with corresponding user data during a program operation. The metadata may include first and second map data stored in the memory blocks 152 to 156 in the form of a map table. The first map data may be logical-to-physical information representing mapping information between a logical address and a physical address for the user data. The second map data may be physical-to-logical information representing mapping information between the physical address and the logical address for the user data. Also, the metadata may include information on the command data corresponding to the command received from the host 102, information on the command operation corresponding to the command, information on the memory blocks 152 to 156 of the memory device 150 for which the command operation is to be performed, and information on map data corresponding to the command operation. In other words, the metadata may include all remaining information and data excluding the user data corresponding to the command received from the host 102, The metadata may be stored in the memory blocks 152 to 156 during a program operation.

Data segments of the user data and meta segments of the metadata are stored in the memory blocks of the memory device 150. The meta segments of the metadata may include logical-to-physical (L2P) map segments of the first map data, and physical-to-logical (P2L) map segments of the second map data. The controller 130 stores the data segments of the user data and the meta segments of the metadata in the memory 144 included in the controller 130, and then stores them in the memory blocks of the memory device 150. Particularly as the data segments of the user data are stored in the memory blocks 152 to 156 of the memory device 150 the controller 130 generates and updates the meta segments and stores them during a map flush operation.

Referring to FIG. 5, the controller 130 writes and stores user data corresponding to a write command in memory blocks 552 to 584 of the memory device 150. Further, in correspondence to a write operation to the memory blocks 552 to 584, the controller 130 generates and updates the metadata for the user data and then writes and stores the metadata in the memory blocks 552 to 584 of the memory device 150.

In this regard, the controller 130 generates and updates the first map data and the second map data, indicating that the user data is stored in pages included in the memory blocks 552 to 584 of the memory device 150. More specifically, the controller 130 generates and updates the L2P map segments of the first map data and the P2L map segments of the second map data, and then stores them in pages included in the memory blocks 552 to 584 of the memory device 150 during the map flush operation.

For instance, the controller 130 stores data segments 512 of the user data in the first buffer 510 functioning as a data buffer/cache, and then writes and stores the data segments 512 of the first buffer 510 in pages included in the memory blocks 552 to 584 of the memory device 150.

As the data segments 512 of the user data are written and stored in pages included in the memory blocks 552 to 584 of the memory device 150, the controller 130 generates and stores the L2P map segments 522 of the first map data and P2L map segments 524 of the second map data for the user data in the second buffer 520 functioning as a map buffer/cache.

In addition, the controller 130 writes and stores the L2P and P2L map segments 522 and 524 of the first and second map data of the second buffer 520 in pages included in the memory blocks 552 to 584 of the memory device 150. In an embodiment, the data segments 512 may be stored in data memory blocks, and the L2P map segments 522 of the first map data and the P2L map segments 524 of the second map data may be stored in map memory blocks among the memory blocks 552 to 584. In another embodiment, the data segments 512 and the L2P and P2L map segments 522 and 524 of the first and second map data may be stored in any one among the memory blocks 552 to 584.

Referring to FIG. 6, the memory device 150 includes a plurality of memory dies 610 to 670. Each of the memory dies 610 to 670 includes a plurality of planes. For example, the memory die 610 includes planes 612 to 624, the memory die 630 includes planes 632 to 644, the memory die 650 includes planes 652 to 664, and the memory die 670 includes planes 672 to 684. Each of the planes 612 to 684 of the memory dies 610 to 670 included in the memory device 150 includes a plurality of memory blocks 614 to 686. In this regard, the plurality of memory dies 610 to 670 may be divided into two or more die groups, and the memory dies of the same die group are coupled to the same channel. For example, the memory die 610 and the memory die 650 of a first die group are coupled to channel 602, while the memory die 630 and the memory die 670 of a second die group are coupled to channel 604.

In the present embodiment, the memory blocks 614 to 686 are grouped into a plurality of super memory blocks, and then the user data and metadata may be written and stored in the super memory blocks through a one-shot program.

Each super memory block includes a plurality of memory blocks for example, a first memory block and a second memory block among the memory blocks 614 to 686. The second memory block may be different from the first memory in the same or different plane of the same or different memory die. In the present embodiment, the data segments of the user data and the meta segments of the metadata of the first buffer 510 and the second buffer 520 are stored in one of the memory blocks 614 to 686 or one of the super memory blocks including the first memory block and the second memory block according to the size of data to be stored in the memory device 150.

Particularly, in the present embodiment, the data segments of the user data and the meta segments of the metadata for the user data are stored in the memory blocks or the super memory blocks in an interleaving manner on a page basis, a multi-plane basis, a multi-memory die basis or a multi-channel basis, in particular, by performing a map flush operation to the meta segments of the metadata.

In the present embodiment, latency of the map flush operation of storing the metadata in the memory device 150 is maintained constant and minimized. Also, update overhead of the first map data of the logical-to-physical information (i.e., the L2P map segments), which represents mapping information between the logical address and the physical address for the user data stored in the memory blocks is minimized, thereby the command operation corresponding to the command can be performed more rapidly and reliably.

In this disclosure, it is exemplified that 4 KB-sized data segments and meta segments are respectively written and stored in a 4 KB-sized pages of a first and a second memory blocks included in a super memory block.

Referring to FIGS. 6 and 7, it is assumed that the memory blocks 552 to 562 are included in the plane 612 of the memory die 610, the memory block 564 is included in the plane 616 of the memory die 610, the memory block 572 is included in the plane 652 of the memory die 650, and the memory blocks 574 to 584 are included in the plane 632 of the memory die 630.

As described above, the second memory block of the super memory block may be different from the first memory block of the super memory block in the same or different plane of the same or different memory die. Referring to FIGS. 6 and 7, it is assumed that the memory blocks 554 and 562 may be included in a super memory block 1, the memory blocks 582 and 584 may be included in a super memory block 2 the memory blocks 552 and 564 may be included in a super memory block 3, and the memory blocks 574 and 572 may be included in a super memory block 4.

The plural memory blocks included in each of the super memory blocks are commonly coupled to the same channel. Therefore, the memory blocks 554 and 562 of the super memory block 1 may be commonly coupled to a first channel, the memory blocks 582 and 584 of the super memory block 2 may be commonly coupled to a second channel, the memory blocks 554 and 564 of the super memory block 3 may be commonly coupled to a third channel, and the memory blocks 554 and 572 of the super memory block 4 may be commonly coupled to a fourth channel. That is, elementary memory blocks of the super memory block may be selected in the same memory die or different memory die commonly coupled to the same channel.

According to the present embodiment, the controller 130 writes and stores the user data corresponding to a write command and the metadata for the user data in the memory blocks 552 and 574, or the super memory blocks 1 to 4.

Referring to FIG. 7, when performing a command operation corresponding to a command received from the host, the controller 130 stores data segments 700 of user data in the first buffer 510 included in the memory 144 of the controller 130.

In this regard the data segments 700 of the user data stored in the first buffer 510 of the controller 130 include data segments 0 to 10 respectively having logical page numbers 0 to 10 or Logical Block Addresses (LBAs) for example, a data segment 702 (hereinafter, referred to as 'data segment 0') having logical page number 0, a data segment 704 (hereinafter, referred to as 'data segment 1') having logical page number 1, a data segment 706 (hereinafter, referred to as 'data segment 2') having logical page number 2, a data segment 708 (hereinafter, referred to as 'data segment 3') having logical page number 3, a data segment 710 (hereinafter, referred to as data segment 4') having logical page number 4, a data segment 712 (hereinafter, referred to as 'data segment 5') having logical page number 5, a data segment 714 (hereinafter, referred to as 'data segment 6') having logical page number 6, a data segment 716 (hereinafter, referred to as 'data segment 7') having logical page number 7, a data segment 718 (hereinafter, referred to as data segment 8') having logical page number 8, a data segment 720 (hereinafter, referred to as 'data segment 9') having logical page number 9, and a data segment 722 (hereinafter, referred to as 'data segment 10') having logical page number 10.

Furthermore, when performing the command operation corresponding to the command received from the host 102, the controller 130 also stores the meta segments 740 of metadata including first map data and second map data for the user data in the second buffer 520 included in the memory 144 of the controller 130.)

In this regard, the meta segments 740 of the metadata stored in the second buffer 520 of the controller 130 include meta segments 0 to 10. Specifically, as illustrated in FIG. 7, the meta segments 740 include a meta segment 742 (referred to as 'meta segment 0') having segment index 0 of the metadata, a meta segment 744 (referred to as 'meta segment 1') having segment index 1 of the metadata, a meta segment 746 (referred to as 'meta segment 2') having segment index 2 of the metadata, a meta segment 748 (referred to as 'meta segment 3') having segment index 3 of the metadata, a meta segment 750 (referred to as 'meta segment 4') having segment index 4 of the metadata, a meta segment 752 (referred to as 'meta segment 5') having segment index 5 of the metadata, a meta segment 754 (referred to as 'meta segment 6') having segment index 6 of the metadata, a meta segment 756 (referred to as 'mete segment 7') having segment index 7 of the metadata, a meta segment 758 (referred to as 'meta segment 8') having segment index 8 of the metadata, a meta segment 760 (referred to as 'meta segment 9') having segment index 9 of the metadata, and a meta segment 762 (referred to as 'meta segment 10') having segment index 10 of the metadata.

As described above, the meta segments 740 of the metadata stored in the second buffer 520 respectively include the L2P map segments of the first map data and the P2L map segments of the second map data for the data segments 700. Each of the L2P map segments includes the logical-to-physical information on data segments having arbitrary page numbers in a form of an L2P map table. Each of the P2L map segments includes the physical-to-logical information on memory blocks in which data segments having arbitrary page numbers in a form of a P2L table.

For example, it is assumed that in the meta segments 740 of the metadata stored in the second buffer 520 that the meta segment 0 may include L2P map segments and P2L map segments for data segments of the logical page numbers 0 to 15, the meta segment 1 may include L2P map segments and P2L map segments for data segments of the logical page numbers 13 to 23, and meta segment 2 may include L2P map segments and P2L map segments for data segments of logical page numbers 24 to 31.

The controller 130 writes and stores the data segments 700 of the first buffer 510 and the meta segments 740 of the second buffer 520 in the same one or different ones among the plurality of memory blocks included in the memory device 150.

In the present embodiment, when a number of data segments 700 stored in the first buffer 510 reaches a first trigger threshold number, the data segments 700 of the first buffer 510 are written and stored in the memory blocks 552 to 584 of the memory device 150. The first trigger threshold number may depend on a size of data to be programmed in the memory device 150 and a tPROG time of the memory device 150.)

When the number of meta segments 740 stored in the second buffer 520 reaches a second trigger threshold number, the meta segments 740 stored in the second buffer 520 are written and stored in the memory blocks 552 to 584 of the memory device 150 through the map flush operation.

In the present embodiment, the data segments 700 of the first buffer 510 and the meta segments 740 of the second buffer 520 may be stored in the plurality of memory blocks 552 to 584 in an interleaving manner on a page basis, a multi-plane basis, a multi-memory die basis or a multi-channel basis.

As an example, in the case where the first trigger threshold number is 1, the controller 130 writes and stores the data segment 702 among the data segments 702 to 722 of the first buffer 510 in page 0 of the memory block 552. In the case where the first trigger threshold number is 2, the controller 130 writes and stores the data segments 704 and 706 of the first buffer 510 in pages 0 and 1 of the memory block 574. In the case where the first trigger threshold number is 4, the controller 130 writes and stores the data segments 708 to 714 of the first buffer 510 in pages 0 and 1 of the memory block 554 that is the first memory block of the super memory block 1, and in page 0 of two among the memory blocks 562, 564 and 572 that are the second memory blocks of the super memory blocks 1, 3 and 4, respectively, in the interleaving manner. In the case where the first trigger threshold number is 4, the controller 130 writes and stores the data segments 716 to 722 of the first buffer 510 in pages 0 and 1 of the memory block 582 that is the first memory block of the super memory block 2, and in pages 0 and 1 of the memory block 584 that is the second memory block of the super memory block 2, respectively, in the interleaving manner.

In the above example, the data segments 700 are stored in the interleaving manner on the page basis. In another embodiment, the data segments 700 are stored in the interleaving manner of a multi-plane basis (e.g. the interleaving manner with the planes 612 and 616 of the memory die 610), a multi-memory die basis (e.g., the interleaving manner with the memory dies 610 and 650), or a multi-channel basis (e.g., the interleaving manner with the channels 602 and 604 respectively coupled to the memory dies 610 and 650 and the memory die 630).

As an example, in the case where the second trigger threshold number is 1, the controller 130 writes and stores the meta segment 742 among the meta segments 742 to 762 of the second buffer 520 in page 1 of the memory block 552. In the case where the second trigger threshold number is 2, the controller 130 writes and stores the meta segments 744 and 746 of the second buffer 520 in pages 2 and 3 of the memory block 574.

As described above, it is exemplified the 4 KB-sized meta segments are written and stored in the 4 KB-sized pages of the first and second memory blocks included in the super memory block. In the case where the L2P map segments and the P2L, map segments for the data segments of the logical page numbers 0 to 15 are included in the meta segment 742, the controller 130 updates the L2P map segments and P2L map segments according to the program operation with the data segments of the logical page numbers 0 to 15. When the second trigger threshold number is 1 and the size of the meta segment 742 becomes 4 KB, the controller 130 stores the meta segment 742 in the page 1 of the memory block 552. Furthermore, when the trigger threshold number is 2 and each of the meta segments 744 and 746 becomes 4 KB, the controller 130 stores the meta segments 744 and 746 in the pages 2 and 3 of the memory block 574.

In the case where the second trigger threshold number is 4 and each of meta segments 748 to 754 becomes 4 KB, the controller 130 writes and stores the meta segments 748 to 754 of the second buffer 520 in pages 2 and 3 of the memory block 554 that is the first memory block of the super memory block 1, and in page 2 of two among the memory blocks 562, 564 and 572 that are the second memory blocks of the super memory blocks 1, 3 and 4, respectively, in the interleaving manner. In the case where the second trigger threshold number is 4 and each of meta segments 756 to 762 becomes 4 KB, the controller 130 writes and stores the meta segments 756 to 762 in pages 2 and 3 of the memory block 582 that is the first memory block of the super memory block 2, and the memory block 584 that is the second memory block of the super memory block 2, respectively, in the interleaving manner.

In the above example, the meta segments 740 are stored in the interleaving manner on the page basis. In another embodiment, the meta segments 740 are stored in the interleaving manner on a multi-plane basis (e.g., the interleaving manner with the planes 612 and 616 of the memory die 610), a multi-memory die basis (e.g., the interleaving manner with the memory dies 610 and 650) or a multi-channel basis (e.g., the interleaving manner with the channels 602 and 604 respectively coupled to the memory dies 610 and 650 and the memory die 630).

Figure 8:
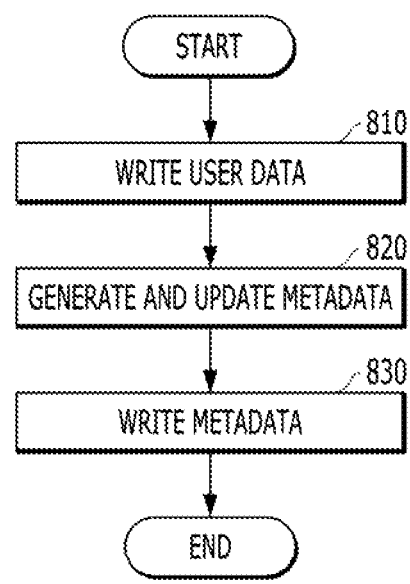
FIG. 8 is a flowchart illustrating an operation of a memory system according to an embodiment of the present invention.

FIG. 8 is a flowchart illustrating an operation of the memory system 110 of FIG. 1, according to an embodiment of the present invention.

Referring to FIGS. 7 and 8 at step 810, during a write operation the controller 130 writes the user data corresponding to a write request received from the host 102. Writing the user data includes a first storing of the data segments 700 of the user data in the first buffer 510 included in the memory 144 of the controller 130, and then a second storing of the data segments 700 of the first buffer 510 in one or more memory blocks of the memory device 150 when the number of data segments 700 stored in the first buffer 510 reaches a first trigger threshold number.

At step 820, the metadata e.g., the map data for the user data stored in the one or more memory blocks of the memory device 150, is generated and updated.

Subsequently, at step 830, the controller writes the metadata which includes a first storing of the meta segments of the metadata including the generated and updated map data in the second buffer 520 included in the memory 144 of the controller 130, and then a second storing of the meta segments 740 of the second buffer 520 in one or more memory blocks of the memory device 150 when the number of meta segments 740 stored in the second buffer 520 reaches a second trigger threshold number.

Each of the aforementioned steps 810 to 830 may be performed as described earlier with reference to FIGS. 5 to 7.

FIGS. 9 to 14 are diagrams illustrating memory systems according to various embodiments of the present invention.

Figure 9:
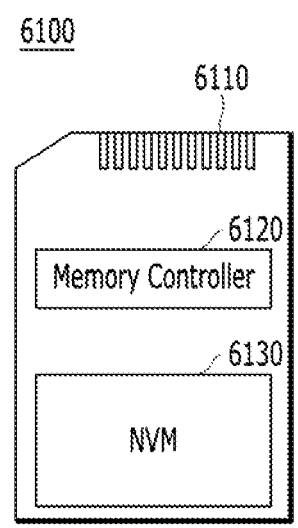
FIG. 9 is a diagram schematically illustrating a memory card, according to an embodiment of the present invention.

FIG. 9 is a diagram illustrating a memory card system 6100 as the data processing system described above with reference to FIGS. 1 to 8.

Referring to FIG. 9, the memory card system 6100 includes a memory controller 6120, a memory device 6130, and a connector 6110.

In detail, the memory controller 6120 may be connected with the memory device 6130 and may access the memory device 6130. In some embodiments, the memory device 6130 may be implemented with a nonvolatile memory (NVM). The memory controller 6120 may control read, write, erase and background operations for the memory device 6130. The memory controller 6120 may provide an interface between the memory device 6130 and a host (not shown), and may drive a firmware for controlling the memory device 6130. For example, the memory controller 6120 may correspond to the controller 130 in the memory system 110 described above with reference to FIG. 1, and the memory device 6130 may correspond to the memory device 150 in the memory system 110 described above with reference to FIG. 1.

Therefore, the memory controller 6120 may include components such as a random access memory (RAM), a processing unit, a host interface, a memory interface and an error correction unit as shown in FIG. 1.

The memory controller 6120 may communicate with an external device (for example, the host 102 described above with reference to FIG. 1), through the connector 6110. For example, as described above with reference to FIG. 1, the memory controller 6120 may be configured to communicate with the external device through at least one of various communication protocols such as a universal serial bus (USB), multimedia card (MMC) an embedded MMC (eMMC), a peripheral component interconnection (PCI) a PCI express (PCIe), an advanced technology attachment (ATA), a serial-ATA, a parallel-ATA, a small computer system interface (SCSI), enhanced small disk interface (ESDI), an integrated drive electronics (IDE), a firewire, a universal flash storage (UFS), a wireless-fidelity (WI-FI) and a bluetooth. Accordingly, the memory system and the data processing system according to the embodiment may be applied to wired/wireless electronic appliances, for example, a mobile electronic appliance.

The memory device 6130 may be implemented with a nonvolatile memory. For example, the memory device 6130 may be implemented with various nonvolatile semiconductor memory devices such as an electrically erasable and programmable ROM (EPROM), a NAND flash memory, a NOR flash memory, a phase-change RAM (PRAM), a resistive RAM (ReRAM), a ferroelectric RAM (FRAM) and a spin torque transfer magnetic RAM (STT-MRAM).

The memory controller 6120 and the memory device 6130 may be integrated into a single semiconductor device. For example, the memory controller 6120 and the memory device 6130 may construct a solid state driver (SSD) by being integrated into a single semiconductor device. The memory controller 6120 and the memory device 6130 may construct a memory card such as a PC card (PCMCIA Personal Computer Memory Card International Association), a compact flash card (CF), a smart media card (SM and SMC), a memory stick, a multimedia card (MMC, RS-MMC, MMCmicro and eMMC), an SD card (e.g., SD, miniSD, microSD and SDHC) and a universal flash storage (UFS).

Figure 10:
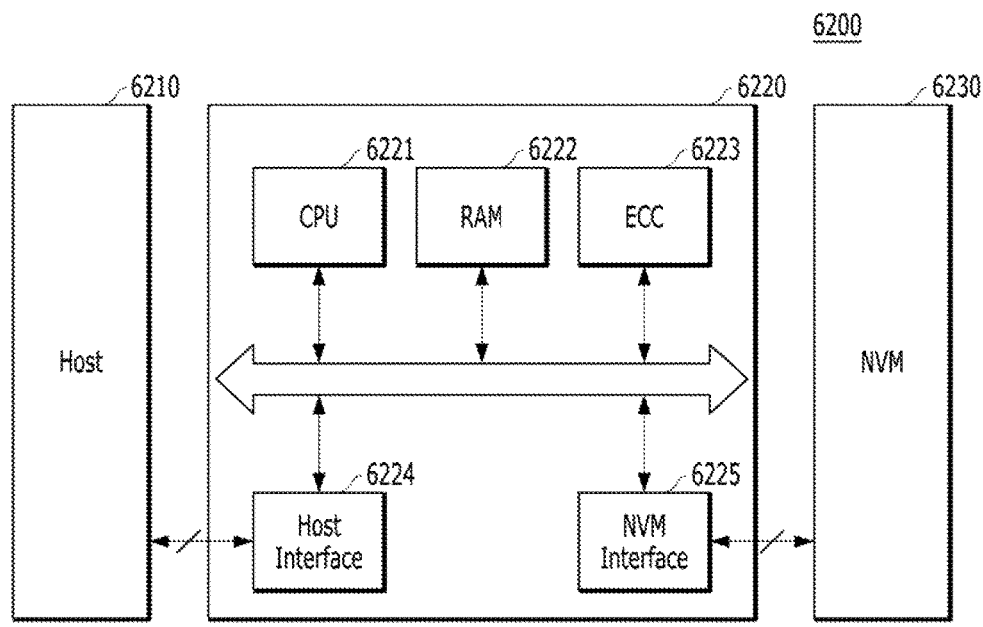
FIG. 10 is a diagram schematically illustrating a data processing system, according to an embodiment of the present invention.

FIG. 10 is a diagram schematically illustrating an example of a data processing system including a memory system, according to an embodiment of the present invention.

Referring to FIG. 10, a data processing system 6200 includes a memory device 6230 which may be implemented with at least one nonvolatile memory (NVM) and a memory controller 6220 for controlling the memory device 6230. The data processing system 6200 may be a storage medium such as a memory card (e.g., CF, SD and microSD), as described above with reference to FIG. 1. The memory device 6230 may correspond to the memory device 150 in the memory system 110 described above with reference to FIG. 1, and the memory controller 6220 may correspond to the controller 130 in the memory system 110 described above with reference to FIG. 1.

The memory controller 6220 may control the operations, including the read, write and erase operations for the memory device 6230 in response to requests received from a host 6210. The memory controller 6220 may include a central processing unit (CPU) 6221, a random access memory (RAM) as a buffer memory 6222, an error correction code (ECC) circuit 6223, a host interface 6224, and an NVM interface as a memory interface 6225, all coupled via an internal bus.

The CPU 6221 may control the operations for the memory device 6230 such as read, write, file system management, bad page management, and so forth. The RAM 6222 may operate according to control of the CPU 6221, and may be used as a work memory, a buffer memory, a cache memory, or the like. In the case where the RAM 6222 is used as a work memory, data processed by the CPU 6221 is temporarily stored in the RAM 6222. In the case where the RAM 6222 is used as a buffer memory, the RAM 6222 is used to buffer data to be transmitted from the host 6210 to the memory device 6230 or from the memory device 6230 to the host 6210. In the case where the RAM 6222 is used as a cache memory, the RAM 6222 may be used to enable the memory device 6230 with a low speed to operate at a high speed.

The ECC circuit 6223 corresponds to the ECC unit 138 of the controller 130 described above with reference to FIG. 1. As described above with reference to FIG. 1, the ECC circuit 6223 may generate an error correction code (ECC) for correcting a fail bit or an error bit in the data received from the memory device 6230. The ECC circuit 6223 may perform error correction encoding for data to be provided to the memory device 6230, and may generate data added with parity bits. The parity bits may be stored in the memory device 6230. The ECC circuit 6223 may perform error correction decoding for data outputted from the memory device 6230. At this time, the ECC circuit 6223 may correct errors by using the parity bits. For example, as described above with reference to FIG. 1, the ECC circuit 6223 may correct errors by using various coded modulations such as of a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM) and a Block coded modulation (BCM).

The memory controller 6220 transmits and receives data to and from the host 6210 through the host interface 6224, and transmits and receives data to and from the memory device 6230 through the NVM interface 6225. The host interface 6224 may be connected with the host 5210 through at least one of various interface protocols such as a parallel advanced technology attachment (PATA) bus, a serial advanced technology attachment (SATA) bus, a small computer system interface (SCSI), a universal serial bus (USB), a peripheral component interconnection express (PCIe) or a NAND interface. Further, as a wireless communication function or a mobile communication protocol such as wireless fidelity (WI-FI) or long term evolution (LTE) is realized, the memory controller 6220 may transmit and receive data by being connected with an external device such as the host 6210 or another external device other than the host 6210. Specifically, as the memory controller 6220 is configured to communicate with an external device through at least one among various communication protocols, the memory system and the data processing system according to the embodiment may be applied to wired/wireless electronic appliances. For example, a mobile electronic appliance.

Figure 11:
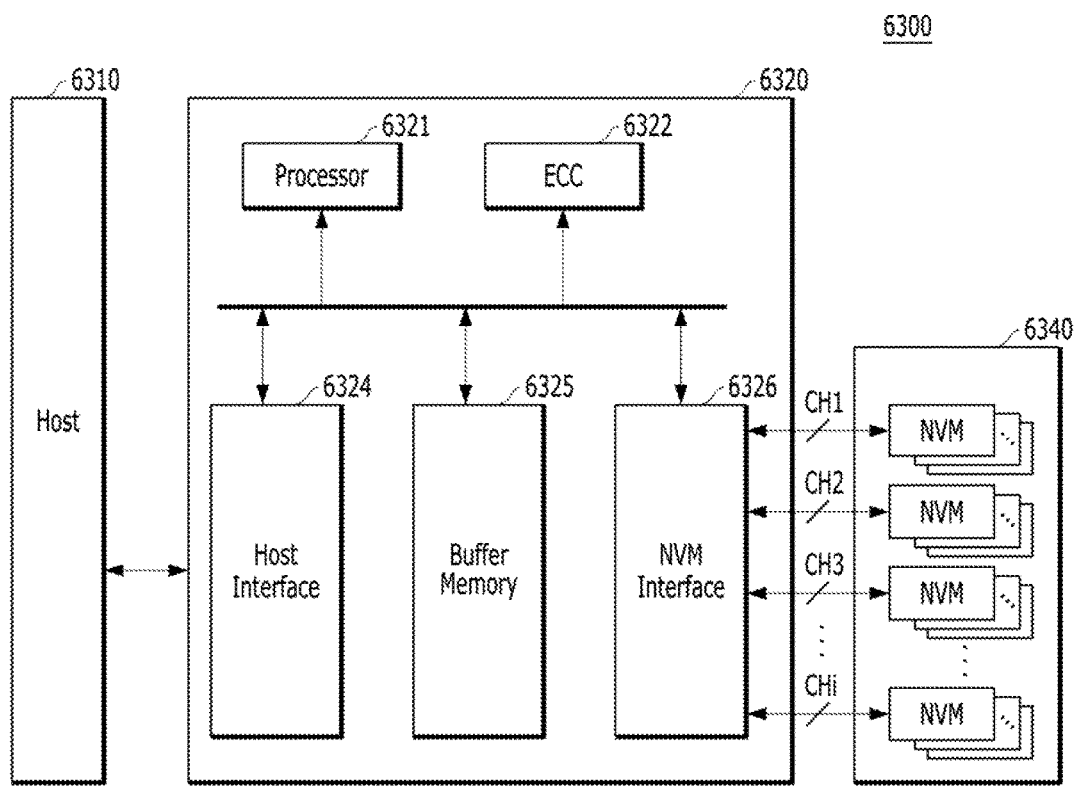
FIG. 11 is a diagram schematically illustrating a solid state drive, according to an embodiment of the present invention.

FIG. 11 is a diagram illustrating an example of a data processing system including a memory system according to an embodiment of the invention. FIG. 11 may be a solid state drive (SSD).

Referring to FIG. 11, an SSD 6300 may include a memory device 6340 which may include a plurality of nonvolatile memories NVM, and a controller 6320. The controller 6320 may correspond to the controller 130 in the memory system 110 described above with reference to FIG. 1, and the memory device 6340 may correspond to the memory device 150 in the memory system 110 described above with reference to FIG. 1.

The controller 6320 may be connected with the memory device 6340 through a plurality of channels CH1, CH2, CH3, and CHi. The controller 6320 may include a processor 6321, a buffer memory 6325, an error correction code (ECC) circuit 6322, a host interface 6324, and a nonvolatile memory (NVM) interface as a memory interface 6326 coupled via an internal bus.

The buffer memory 6325 temporarily stores data received from a host 6310 or data received from a plurality of nonvolatile memories NVMs included in the memory device 6340. The buffer memory 6325 also temporarily stores metadata of the plurality of nonvolatile memories NVMs. For example, the metadata may include map data including mapping tables. The buffer memory 6325 may be implemented with a volatile memory such as, but not limited to, a dynamic random access memory (DRAM), a synchronous dynamic random access memory (SDRAM), a double data rate (DDR) SDRAM a low power double data rate (LPDDR) SDRAM and a graphic random access memory (GRAM) or a nonvolatile memory such as, but not limited to, a ferroelectric random access memory (FRAM), a resistive random access memory (ReRAM), a spin-transfer torque magnetic random access memory (STT-MRAM) and a phase change random access memory (PRAM). While it is illustrated in FIG. 11, for the sake of convenience in explanation, that the buffer memory 6325 is disposed inside the controller 6320, it is to be noted that the buffer memory 6325 may be disposed outside the controller 6320.

The ECC circuit 6322 calculates error correction code values of data to be programmed in the memory device 6340 in a program operation, performs an error correction operation for data read from the memory device 6340, based on the error correction code values, in a read operation, and performs an error correction operation for data recovered from the memory device 6340 in a recovery operation for failed data.

The host interface 6324 provides an interface function with respect to an external device such as the host 6310. The nonvolatile memory interface 6326 provides an interface function with respect to the memory device 6340 which is connected through the plurality of channels CH1, CH2, CH3, . . . and CHi.

In an embodiment, a redundant array of independent disks (RAID) system is provided, the system including a plurality of SSDs 6300. Each SSD 6300 may employ the memory system 110 described above with reference to FIG. 1. In the RAID system, the plurality of SSDs 6300 and a RAID controller for controlling the plurality of SSDs 6300 may be included. In the case of performing a program operation by receiving a write command from the host 6310, the RAID controller may select at least one memory system (for example, at least one SSD 6300) in response to the RAID level information of the write command received from the host 6310, among a plurality of RAID levels (for example, the plurality of SSDs 6300) and may output data corresponding to the write command, to the selected SSD 6300. In the case of performing a read operation by receiving a read command from the host 6310, the RAID controller may select at least one memory system (for example, at least one SSD 6300) in response to the RAID level information of the write command received from the host 6310, among the plurality of RAID levels (for example, the plurality of SSDs 6300), and may provide data outputted from the selected SSD 6300, to the host 6310.

Figure 12:
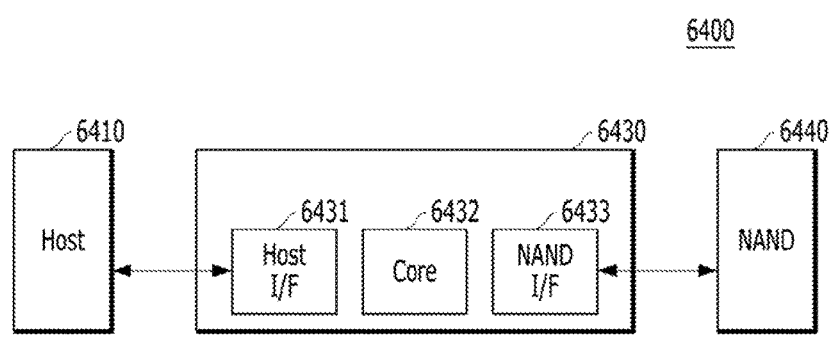
FIG. 12 is a diagram schematically illustrating an embedded multimedia card, according to an embodiment of the present invention.

FIG. 12 illustrates an embedded multimedia card (eMMC) including a memory system according to an embodiment of the present invention.

Referring to FIG. 12, an eMMC 6400 includes a memory device 6440 which is implemented with at least one NAND flash memory, and a controller 6430. The controller 6430 may correspond to the controller 130 in the memory system 110 described above with reference to FIG. 1. The memory device 6440 may correspond to the memory device 150 in the memory system 110 described above with reference to FIG. 1.

In more detail, the controller 6430 may be connected with the memory device 6440 through a plurality of channels indicated by the two headed arrow. The controller 6430 may include a core 6432, a host interface 6431, and a memory interface 643 such as a NAND memory interface 6433.

The core 6432 may control the operations of the eMMC 6400. The host interface 6431 may provide an interface function between the controller 6430 and a host 6410. The NAND interface 6433 may provide an interface function between the memory device 6440 and the controller 6430. For example, the host interface 6431 may be a parallel interface such as an MMC interface, as described above with reference to FIG. 1, or a serial interface such as an ultra-high speed class 1 (UHS-I)/UHS class 2 (UHS-II) and a universal flash storage (UFS) interface.

Figure 13:
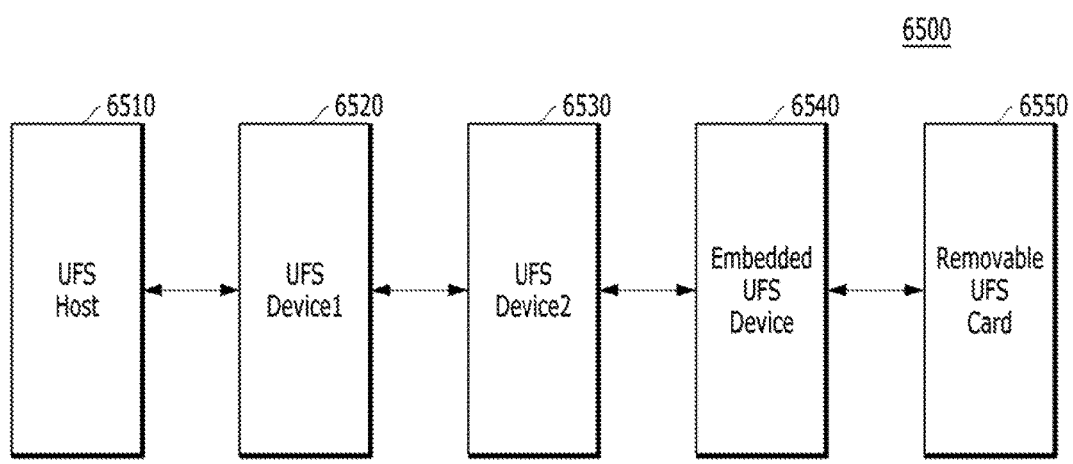
FIG. 13 is a diagram schematically illustrating a universal flash drive, according to an embodiment of the present invention.

FIG. 13 is a diagram schematically illustrating a universal flash storage (UFS) system 6500 including a memory system according to an embodiment of the present invention.

Referring to FIG. 13, the UFS system 6500 may include a UFS host 6510, a plurality of UFS devices 6520 and 6530, an embedded UFS device 6540, and a removable UFS card 6550. The UFS host 6510 may be an application processor of wired/wireless electronic appliances, for example, a mobile electronic appliance.

The UFS host 6510, the UFS devices 6520 and 6530, the embedded UFS device 6540 and the removable UFS card 6550 may respective y communicate with external devices such as wired/wireless electronic appliances (for example, a mobile electronic appliance), through a UFS protocol. The UFS devices 6520 and 6530, the embedded UFS device 6540 and the removable UFS card 6550 may be implemented with the memory system 110 described above with reference to FIG. 1, for example, as the memory card system 6100 described above with reference to FIG. 9. The embedded UFS device 6540 and the removable UFS card 6550 may communicate through another protocol other than the UFS protocol. For example, the embedded UFS device 6540 and the removable UFS card 6550 may communicate through various card protocols such as, but not limited to, USB flash drives (UFDs), multimedia card (MMC), secure digital (SD), mini SD and Micro SD.

Figure 14:
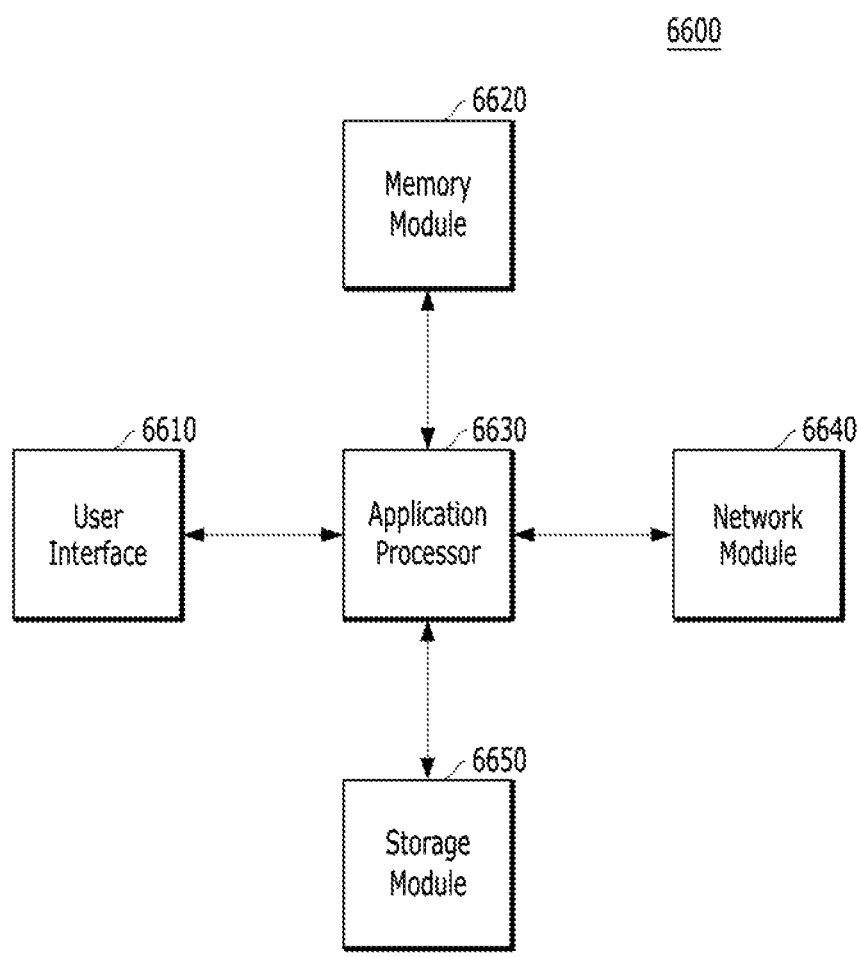
FIG. 14 is a diagram schematically illustrating a user system, according to an embodiment of the present invention.

FIG. 14 is a diagram schematically illustrating a user system 6600 including a memory system, according to an embodiment of the present invention.

The user system 6600 may include an application processor 6630, a memory module 6620, a network module 6640, a storage module 6650, and a user interface 6610.

The application processor 6630 may drive components included in the user system 6600 and an operating system (OS). For example, the application processor 6630 may include controllers for controlling the components included in the user system 6600, interfaces, graphics engines, and so on. The application processor 6630 may be provided as a system-on-chip (SoC).

The memory module 6620 may operate as a main memory, a working memory, a buffer memory or a cache memory of the user system 6600. The memory module 6620 may include a volatile random access memory such as a dynamic random access memory (DRAM), a synchronous dynamic random access memory (SDRAM), a double data rate (DDR) SDRAM, a DDR2 SDRAM, a DDR3 SDRAM, a low power double data rate (LPDDR) SDRAM, an LPDDR2 SDRAM and an LPDDR3 SDRAM or a nonvolatile random access memory such as a phase change random access memory (PRAM), a resistive random access memory (ReRAM), a magnetic random access memory (MRAM) and a ferroelectric random access memory (FRAM). For example, the application processor 6630 and the memory module 6620 may be mounted by being packaged on the basis of a package-on-package (POP).

The network module 6640 may communicate with external devices. For example, the network module 6640 may support not only wired communications but also various wireless communications such as code division multiple access (CDMA), global system for mobile communication (GSM), wideband CDMA (WCDMA), CDMA-2000, time division multiple access (TDMA), long term evolution (LTE), worldwide interoperability for microwave access (WiMAX), wireless local area network (WLAN), ultra-wideband (UWB), Bluetooth, wireless display (WI-DI), and so on, and may thereby communicate with wired/wireless electronic appliances, For example, a mobile electronic appliance. Accordingly, the memory system and the data processing system may be applied to wired/wireless electronic appliances. The network module 6640 may be included in the application processor 6630.

The storage module 6650 may store data such as data received from the application processor 6530, and transmit data stored therein, to the application processor 6530. The storage module 6650 may be realized by a nonvolatile semiconductor memory device such as a phase-change RAM (PRAM), a magnetic RAM (MRAM), a resistive RAM (ReRAM), a NAND flash memory, a NOR flash memory and a 3-dimensional NAND flash memory. The storage module 6650 may be provided as a removable storage medium such as a memory card of the user system 6600 and an external drive. For example, the storage module 6650 may correspond to the memory system 110 described above with reference to FIG. 1, and may be implemented with the SSD, eMMC and UFS described above with reference to FIGS. 11 to 13.

The user interface 6610 may include interfaces for inputting data or commands to the application processor 6630 or for outputting data to an external device. For example, the user interface 6610 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, a light emitting diode (LED), a speaker and a motor.

In the case where the memory system 110 described above with reference to FIG. 1 is applied to the mobile electronic appliance of the user system 6600 according to an embodiment, the application processor 6630 may control the operations of the mobile electronic appliance, and the network module 6640 as a communication module may control wired wireless communication with an external device, as described above. The user interface 6610 as the display/touch module of the mobile electronic appliance displays data processed by the application processor 6630 or supports input of data from a touch panel.

The memory system and the operating method thereof according to the embodiments may reduce the complexity and performance deterioration of the memory system. The memory system and the operating method thereof may also increase the use efficiency of a memory device included in the memory system thereby more quickly and stably processing data to and from the memory device.

Although various embodiments have been described for illustrative purposes, it will be apparent to those skilled in the art that various other changes and modifications may be made without departing from the spirit and scope of the invention as defined in the following claims.

What is claimed is:

1. A memory system comprising:
    a memory device suitable for storing user data and corresponding metadata; and
    a controller including a memory, the controller being suitable for storing a user data and a metadata, corresponding to the user data, in the memory, controlling the memory device for storing therein the user data when a size of the user data stored in the memory reaches a first threshold, and controlling the memory device for storing therein the metadata of the memory when a size of the metadata stored in the memory reaches a second threshold,
    wherein the controller controls the memory device for storing the user data and the metadata of the memory in two or more different memory blocks of the memory device in an interleaving manner, and
    wherein the controller controls the memory device for storing therein the user data and the metadata of the memory when segment numbers of the user data and the metadata reach the first and second thresholds, respectively.

2. The memory system of claim 1, wherein the controller controls the memory device for storing therein the user data and the metadata of the memory in the interleaving manner on a page basis.

3. The memory system of claim 2, wherein the controller controls the memory device for storing therein the metadata of the memory by a unit of a page.

4. The memory system of claim 1, wherein the memory blocks are provided in one or more among a plurality of planes of one or more among a plurality of dies included in the memory device.

5. The memory system of claim 4, wherein the memory blocks are coupled to a same channel.

6. An operating method of a memory system comprising:
    buffering user data and corresponding metadata; and
    storing the buffered user data and the buffered metadata,
    wherein the storing of the buffered user data and the buffered metadata includes:

controlling the memory device for storing therein the user data when a size of the buffered user data reach a first threshold, and controlling the memory device for storing therein the metadata of the memory when a size of the metadata stored in the memory reaches a second threshold, wherein the storing of the buffered user data and the buffered metadata is performed in two or more different memory blocks of the memory system in an interleaving manner, and wherein the storing of the buffered user data and the buffered metadata is respectively performed when segment numbers of the buffered user data and the buffered metadata reach the first and second thresholds, respectively.

7. The operating method of claim 6, wherein the storing of the buffered user data and the buffered metadata is performed in the interleaving manner on a page basis.

8. The operating method of claim 7, wherein the storing of the buffered user data and the buffered metadata includes storing the buffered metadata by a unit of a page.

9. The operating method of claim 6, wherein the user data are stored in a first super memory block through a first one-shot program.

10. The operating method of claim 9, wherein then the metadata are stored in a second super memory block through a second one-shot program.

11. The operating method of claim 10, wherein the first and second super memory blocks are different and the first and second one-shot programs are different.

* * * * *